No. 887,742. PATENTED MAY 12, 1908.
J. S. SCOTT.
SAW SET GAGE.
APPLICATION FILED AUG. 27, 1906.
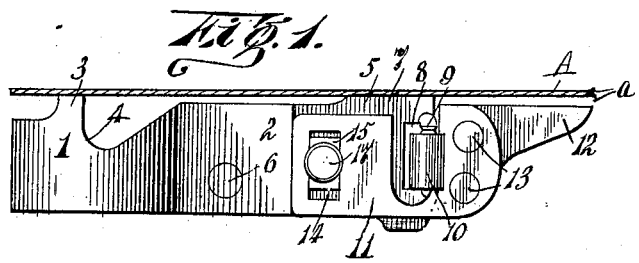
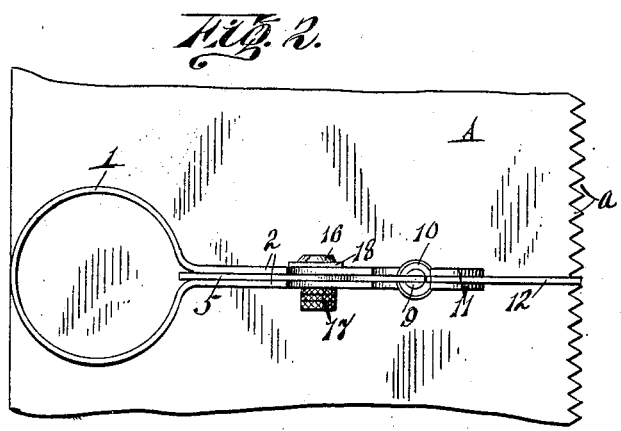
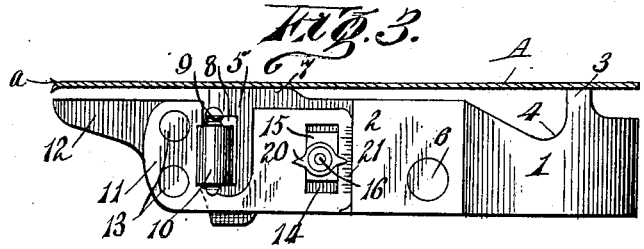
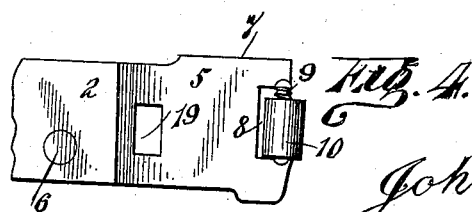
Witnesses: John S. Scott,
Inventor,
By Marion & Marion
Attorneys

UNITED STATES PATENT OFFICE.

JOHN SMITH SCOTT, OF FREDERICTON, NEW BRUNSWICK, CANADA.

SAW-SET GAGE.

No. 887,742.  Specification of Letters Patent.  Patented May 12, 1908.

Application filed August 27, 1906. Serial No. 332,115.

*To all whom it may concern:*

Be it known that I, JOHN SMITH SCOTT, a subject of the King of Great Britain, residing at Fredericton, county of York, in the Province of New Brunswick, Canada, have invented certain new and useful Improvements in Saw-Set Gages; and I do hereby declare that the following is a full, clear, and exact description of the invention, such as will enable others skilled in the art to which it appertains to make and use the same.

My invention relates to saw teeth gages, and, generally speaking, is devised in such manner as to readily ascertain thereby the exact set of any individual tooth to which the instrument may be applied.

One object of the device is to so construct the same as to prevent canting of the gage relative to the saw blade.

Another object is to provide a device of this general class, having an index combined therewith whereby the exact deviation of a tooth from its correct or normal position may be indicated.

Another object is to provide a gage wherein the parts are so connected as to allow the gaging point to be set at any desired position corresponding to the various sets of saw teeth.

Broadly speaking, the device comprises a ring-shaped handle, provided with parallel jaws extending therefrom adapted to receive a plate, wings embracing said plate and slidable thereon, a gaging point fastened to said wings, means for moving said wings and the gaging point attached thereto, and means for indicating the movement of said parts.

In order to more clearly set forth and describe the invention, reference should be had to the accompanying drawings hereto attached, in which similar reference characters refer to like parts throughout the several figures.

In the drawings: Figure 1 is a side elevation of the gage; Fig. 2 is a top plan view; and, Fig. 3 is a side elevation taken on the side opposite to that illustrated in Fig. 1. Fig. 4 is a fragmentary detail in side elevation of the plate and traveling roller.

Referring to the drawings, 1 indicates a ring-shaped handle, by which the device may be moved over the surface of the saw, provided with finger holes or notches 4 and guide lugs 3.

Extending from the handle portion are parallel jaw members 2, adapted to receive and hold therebetween the plate 5. The plate 5 is provided with an offset or lug 7, in alinement with the lug 3 on the handle, and adapted to coöperate therewith to space the device from the blade of the saw, so that it may be readily moved thereover. Adjustably mounted on the plate 5, are the parallel wings 11. Clamped between the outer ends of said wings, is the gage proper or gage point 12, fastened by rivets 13 to said wings.

In order to adjust the gage point to any desired point for gaging saw teeth of various standard sets, the plate 5 is provided with a recess 8, having mounted thereon a screw-threaded rod 9, on which travels the roller 10. Wings 11 are provided with notches, the surfaces of which form shoulders which engage the upper and lower faces respectively of the traveling roller 10, and thereby move the wings 11 and the gage point 12 connected thereto.

In order to preserve absolutely parallel movement of the parts, the edges of the wings 11 and the abutting ends of the jaws 2 are made parallel, whereby the wings are guided in their movement on the plate 5. The wings 11 are provided near their rear ends with slots 14, adapted to receive guide plates 15, mounted on a pin 16, which passes through the blade 5, bearing at one end a thumb nut 17 and at its opposite end a pointer or index needle 20, adapted to coöperate with a scale 21 marked on an adjacent edge of the wing 11.

Obviously, in order to adjust the device to any desired set, all that is necessary is simply to loosen the thumb nut 17, whereby the wings 11 are loose to slide upon the plate 5 to rotate the roller 10, thereby causing it to travel on the rod 9, and to carry with it the wings 11 and the point 12 attached thereto, until the desired set is attained, as will be indicated by the pointer and index above referred to, and to then tighten the thumb nut 17 to again clamp the parts in their adjusted relation.

Having thus fully described my invention, what I claim as new and desire to secure by Letters Patent, is:—

1. A device for gaging the set of saw teeth comprising a handle having a plate extending therefrom, a saw engaging surface on said handle and said plate, at a right angle to the plate, wings slidably mounted on the opposite sides of said plate, a gage point attached to said wings, said wings and gage point being adjustable with respect to said saw engaging surface.

2. In a device of the character described, a handle having a plate extending therefrom, a saw engaging surface on said handle and said plate, at a right angle to the plate, wings slidably mounted on opposite sides of said plate and provided with shoulders, a threaded rod on said plate, a traveling roller threaded on said rod and engaging under said shoulders to thereby move the same upon the said plate, and a gage point attached to the wings.

In witness whereof I have hereunto set my hand in the presence of two witnesses.

JOHN SMITH SCOTT.

Witnesses:
  F. B. SMITH,
  F. J. LYNN.